US012729147B2

(12) United States Patent
Fredholm

(10) Patent No.: US 12,729,147 B2
(45) Date of Patent: Sep. 8, 2026

(54) GLASS MOLDING APPARATUS INCLUDING ADJUSTABLE COOLING NOZZLES AND METHODS OF USING THE SAME

(71) Applicant: CORNING INCORPORATED, Corning, NY (US)

(72) Inventor: Allan Mark Fredholm, Vulaines sur Seine (FR)

(73) Assignee: CORNING INCORPORATED, Corning, NY (US)

(*) Notice: Subject to any disclaimer, the term of this patent is extended or adjusted under 35 U.S.C. 154(b) by 125 days.

(21) Appl. No.: 18/918,742

(22) Filed: Oct. 17, 2024

(65) Prior Publication Data

US 2025/0034022 A1 Jan. 30, 2025

Related U.S. Application Data

(62) Division of application No. 17/307,315, filed on May 4, 2021, now abandoned.

(60) Provisional application No. 63/024,068, filed on May 13, 2020.

(51) Int. Cl.
*C03B 17/06* (2006.01)

(52) U.S. Cl.
CPC .................................. *C03B 17/067* (2013.01)

(58) Field of Classification Search
None
See application file for complete search history.

(56) References Cited

U.S. PATENT DOCUMENTS 2,926,208 A 2/1960 Eden
3,607,183 A 9/1971 Flori
3,682,609 A 8/1972 Dockerty
3,723,082 A 3/1973 Knowles et al.
3,838,997 A 10/1974 Becker et al.
4,067,711 A 1/1978 Jones
(Continued)

FOREIGN PATENT DOCUMENTS

CN 101124174 A * 2/2008 ............. C03B 17/06
CN 106630557 A * 5/2017 ............. C03B 17/06
(Continued)

OTHER PUBLICATIONS

Computer Control the cooling process in permanent (Year: 2015).*
(Continued)

*Primary Examiner* — Jodi C Franklin
(74) *Attorney, Agent, or Firm* — Amy T. Lang; Ye Eun Park

(57) ABSTRACT

A molding apparatus for forming a glass article comprises a mold shell comprising a cooling surface comprising at least a first zone and a second zone; an adjustable nozzle system comprising a mold-facing surface having a plurality of apertures sized to receive a nozzle or a plug; a plurality of nozzles, each coupled to one of the apertures to direct a stream of fluid onto the cooling surface; and a fluid supply providing a fluid through the plurality of nozzles. The fluid is jetted through the nozzles to impinge against the first zone or the second zone of the cooling surface, and a number of nozzles through which the fluid is jetted to impinge against the first zone of the cooling surface is different than a number of nozzles through which the fluid is jetted to impinge against the second zone of the cooling surface.

12 Claims, 6 Drawing Sheets

(56) References Cited

U.S. PATENT DOCUMENTS

| | | | | |
|---|---|---|---|---|
| 4,525,194 | A | 6/1985 | Rudoi | |
| 6,527,993 | B1 | 3/2003 | Hirai et al. | |
| 6,758,064 | B1 | 7/2004 | Kariya | |
| 7,735,338 | B2 | 6/2010 | Mueller et al. | |
| 9,108,873 | B2 | 8/2015 | Maeda et al. | |
| 9,758,418 | B1 * | 9/2017 | El-Kahlout | C03B 17/064 |
| 9,790,119 | B2 * | 10/2017 | Aniolek | C03B 17/067 |
| 10,870,599 | B2 | 12/2020 | Buellesfeld et al. | |
| 2002/0162940 | A1 | 11/2002 | Frul et al. | |
| 2004/0211544 | A1 | 10/2004 | Yanagimoto et al. | |
| 2009/0226733 | A1 | 9/2009 | Kato et al. | |
| 2011/0094267 | A1 * | 4/2011 | Aniolek | C03B 17/065 65/91 |
| 2013/0118206 | A1 | 5/2013 | Maeda et al. | |
| 2014/0013805 | A1 * | 1/2014 | Kariya | C03B 17/067 65/85 |
| 2014/0290899 | A1 | 10/2014 | Dittenberger et al. | |
| 2014/0352355 | A1 | 12/2014 | Boudreau et al. | |
| 2016/0107921 | A1 | 4/2016 | Brown | |
| 2017/0057874 | A1 | 3/2017 | Miao et al. | |
| 2017/0216908 | A1 | 8/2017 | Brugger et al. | |
| 2018/0037489 | A1 | 2/2018 | Ono | |
| 2018/0079675 | A1 | 3/2018 | Afzal et al. | |
| 2018/0244566 | A1 | 8/2018 | Hamilton et al. | |
| 2018/0334405 | A1 | 11/2018 | Buellesfeld et al. | |
| 2019/0202729 | A1 | 7/2019 | Champion et al. | |
| 2019/0381560 | A1 | 12/2019 | Bcking et al. | |

FOREIGN PATENT DOCUMENTS

| | | | | |
|---|---|---|---|---|
| CN | 109311720 | A * | 2/2019 | B65G 49/065 |
| CN | 120794304 | A * | 10/2025 | C03B 27/04 |
| DE | 102019129036 | A1 * | 4/2021 | B23K 26/703 |
| EP | 0121346 | A1 | 10/1984 | |
| EP | 3587364 | A1 | 1/2020 | |
| KR | 20150113898 | A * | 10/2015 | C03B 17/067 |
| WO | WO-2011066064 | A2 * | 6/2011 | C03B 17/067 |
| WO | WO-2018232159 | A2 * | 12/2018 | C03B 17/067 |
| WO | WO-2020031811 | A1 * | 2/2020 | C03B 18/02 |
| WO | WO-2020264252 | A1 * | 12/2020 | C03B 17/067 |

OTHER PUBLICATIONS

International Search Report and Written Opinion of the International Searching Authority; PCT/US2021/030536 Mailed on Jul. 21, 2021, 10 pages; European Patent Office.

* cited by examiner

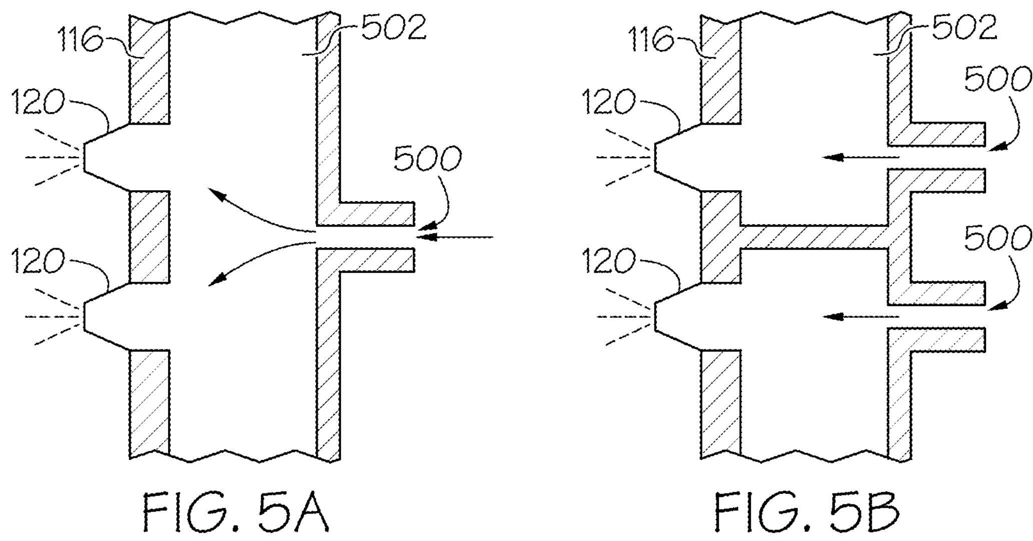
FIG. 5A
FIG. 5B
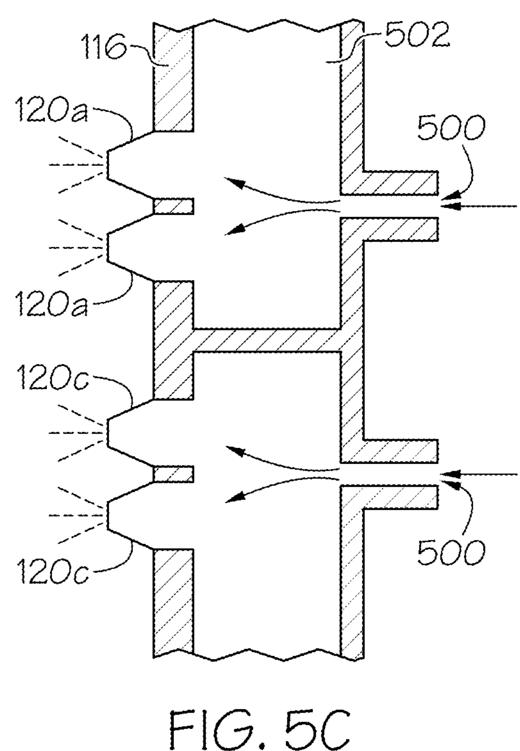
FIG. 5C

GLASS MOLDING APPARATUS INCLUDING ADJUSTABLE COOLING NOZZLES AND METHODS OF USING THE SAME

This application is a divisional of and claims the benefit of priority under 35 U.S.C. § 120 of U.S. application Ser. No. 17/307,315, filed May 4, 2021, which claims priority under 35 USC § 119(e) from U.S. Provisional Patent Application Ser. No. 63/024,068 filed on May 13, 2020 which is incorporated by reference herein in its entirety.

FIELD

The present specification generally relates to molds and, more particularly, to molds for forming glass articles.

BACKGROUND

Conventional processes for forming glass articles may include the use of at least one mold. Although various molding technologies are available, a challenge common among many such technologies is establishing an adequate heat extraction rate. Inadequate heat extraction rates can lead to cosmetic defects in the resultant glass article, such as wavy surfaces, and/or to mechanical defects, such as cracks, when the mold is too cold. Conversely, when the mold is too, glass may stick to the glass contact surface of the mold.

Conventional molding processes typically rely on one or more cooling types, such as fan blown air, compressed air, or water or other liquid cooling. The use of water cooling is limited by the temperature of the surface to be cooled, which must be between about room temperature and about 140° C. Although air cooling is not temperature limited, heat transfer coefficients of air cooling methods are limited to around 500 $W/m^2K$, which is well below the heat transfer coefficients of water cooling, which can be up to around 10,000 $W/m^2K$ for forced convection regimes or even higher for other regimes.

In addition, some molding applications have variable heat extraction rate targets over the surface of the mold. For example, some molding applications have areas that require a large amount of heat removal as well as areas that require a relatively lower amount of heat removal.

Accordingly, a need exists for molding apparatuses with tunable heat extraction rates over a cooling surface of the mold.

SUMMARY

Various embodiments described herein enable adjustment of the heat extraction within a number of zones through the use of a molding apparatus comprising a mold shell comprising a cooling surface and a glass contact surface, an adjustable nozzle system comprising a mold-facing surface having a plurality of apertures, and a plurality of nozzles, each of which is coupled to and extends through a corresponding one of the plurality of apertures. The molding apparatus further includes a fluid supply coupled to the adjustable nozzle system for providing a fluid through the plurality of nozzles to impinge against a first zone or a second zone of the cooling surface of the mold shell. A number of nozzles through which a fluid is jetted to impinge against the first zone of a cooling surface differs from a number of nozzles through which a fluid is jetted to impinge against a second zone of the cooling surface of the mold shell, thereby providing different cooling rates at the first zone and the second zone.

According to a first aspect disclosed herein, a molding apparatus for forming a glass article comprises a mold shell comprising a cooling surface and a glass contact surface, wherein the cooling surface comprises at least a first zone and a second zone; an adjustable nozzle system comprising a mold-facing surface having a plurality of apertures, sized to receive a nozzle or a plug; a plurality of nozzles, each of the plurality of nozzles coupled to and extending through a corresponding one of the plurality of apertures and oriented to direct a stream of fluid onto the cooling surface of the mold shell; and a fluid supply coupled to the adjustable nozzle system for providing a fluid through the plurality of nozzles of the adjustable nozzle system, wherein: the fluid is jetted through the plurality of nozzles to impinge against the first zone or the second zone of the cooling surface of the mold shell; and a number of nozzles through which the fluid is jetted to impinge against the first zone of the cooling surface of the mold shell is different than a number of nozzles through which the fluid is jetted to impinge against the second zone of the cooling surface of the mold shell.

According to a second aspect disclosed herein, a molding apparatus comprises the molding apparatus of the first aspect, wherein the first zone and the second zone are thermally isolated from one another by a deflector extending outward from the cooling surface, a groove in the cooling surface, or a combination thereof.

According to a third aspect disclosed herein, a molding apparatus comprises the molding apparatus of the first or second aspects, further comprising at least one plug coupled to a corresponding one of the plurality of apertures, wherein the at least one plug causes an amount of fluid impinging against the first zone to differ from an amount of fluid impinging against the second zone.

According to a fourth aspect disclosed herein, a molding apparatus comprises the molding apparatus of any of the previous aspects, wherein the amount of fluid impinging against the first zone is greater than an amount of fluid impinging against the second zone.

According to a fifth aspect disclosed herein, a molding apparatus comprises the molding apparatus of any of the previous aspects, wherein the fluid supply provides fluid through an inlet in the adjustable nozzle system, and the fluid exits the adjustable nozzle system through two or more of the plurality of nozzles.

According to a sixth aspect disclosed herein, a molding apparatus comprises the molding apparatus of any of the first through fourth aspects, wherein: each of the plurality of nozzles in the adjustable nozzle system is fluidly coupled to a corresponding inlet of a plurality of inlets; the fluid supply provides fluid through one or more of the plurality of inlets; and the fluid exits the corresponding nozzle fluidly coupled to each of the one or more of the plurality of inlets.

According to a seventh aspect disclosed herein, a molding apparatus for forming a glass article comprises: a mold shell comprising a cooling surface and a glass contact surface, the glass contact surface defining a cavity within the mold shell for receiving a flow of molten glass, wherein the cooling surface comprises at least a first zone and a second zone, wherein the first zone and the second zone are thermally isolated from one another; an adjustable nozzle system comprising a mold-facing surface having a plurality of apertures, sized to receive a nozzle or a plug; a plurality of nozzles, each of the plurality of nozzles coupled to and extending through a corresponding one of the plurality of apertures and oriented to direct a stream of fluid onto the cooling surface of the mold shell; and a fluid supply coupled to the adjustable nozzle system for providing a fluid through the plurality of nozzles of the adjustable nozzle system, wherein: the fluid is jetted through the plurality of nozzles to impinge against the first zone or the second zone of the cooling surface of the mold shell; and a number of nozzles through which the fluid is jetted to impinge against the first zone of the cooling surface of the mold shell is different than a number of nozzles through which the fluid is jetted to impinge against the second zone of the cooling surface of the mold shell.

According to an eighth aspect disclosed herein, a molding apparatus comprises the molding apparatus of the seventh aspects, wherein the cooling surface comprises a deflector extending outward from the cooling surface, and wherein the deflector redirects the fluid impinging the first zone or the second zone to prevent the fluid from contacting the other of the second zone or the first zone of the cooling surface of the mold shell.

According to a ninth aspect disclosed herein, a molding apparatus comprises the molding apparatus of the seventh or eighth aspects, wherein the cooling surface further comprises at least one groove between the first zone and the second zone.

According to a tenth aspect disclosed herein, a molding apparatus comprises the molding apparatus of any of the eighth or ninth aspects, wherein the at least one deflector extends outward from the cooling surface along a longitudinal edge of the at least one groove.

According to an eleventh aspect disclosed herein, a molding apparatus comprises the molding apparatus of any of the seventh through tenth aspects, wherein the cooling surface comprises at least one groove between the first zone and the second zone.

According to a twelfth aspect disclosed herein, a molding apparatus comprises the molding apparatus of any of the seventh through eleventh aspects, further comprising at least one plug coupled to a corresponding one of the plurality of apertures, wherein the at least one plug causes an amount of fluid impinging against the first zone to differ from an amount of fluid impinging against the second zone.

According to a thirteenth aspect disclosed herein, a molding apparatus comprises the molding apparatus of any of the seventh through twelfth aspects, wherein the first zone is disposed adjacent a glass inlet into which molten glass is flowed and the second zone is disposed adjacent a glass outlet of which a solid glass article is produced.

According to a fourteenth aspect disclosed herein, a molding apparatus comprises the molding apparatus of any of the seventh through thirteenth aspects, wherein the amount of fluid impinging the first zone is greater than an amount of fluid impinging the second zone.

According to a fifteenth aspect disclosed herein, a molding apparatus comprises the molding apparatus of any of the seventh through fourteenth aspects, wherein the fluid supply provides fluid through an inlet in the adjustable nozzle system, and the fluid exits the adjustable nozzle system through two or more of the plurality of nozzles.

According to a sixteenth aspect disclosed herein, a molding apparatus comprises the molding apparatus of any of the seventh through fourteenth aspects, wherein: each of the plurality of nozzles in the adjustable nozzle system is fluidly coupled to a corresponding inlet of a plurality of inlets; the fluid supply provides fluid through one or more of the plurality of inlets; and the fluid exits the corresponding nozzle fluidly coupled to each of the one or more of the plurality of inlets.

According to a seventeenth aspect disclosed herein, a method of cooling molten glass to form a glass article comprises: flowing molten glass into a cavity defined by a cooling surface of a mold shell, wherein the cooling surface comprises at least a first zone and a second zone, wherein the first zone and the second zone are thermally isolated from one another; supplying fluid to an adjustable nozzle system comprising a mold-facing surface having a plurality of apertures, each of the plurality of apertures sized to receive one of a nozzle or a plug; and jetting the fluid through the plurality of nozzles, each of the plurality of nozzles coupled to and extending through a corresponding one of the plurality of apertures and oriented to direct a stream of fluid onto the cooling surface of the mold shell, to impinge against the first zone to cause a first cooling intensity and to impinge against the second zone of the cooling surface to cause a second cooling intensity, the first cooling intensity and the second cooling intensity drawing heat away from the molten glass, thereby cooling the molten glass to form a glass article, wherein the second cooling intensity is different from the first cooling intensity.

According to an eighteenth aspect disclosed herein, a method comprises the method of the seventeenth aspect, wherein a number of the plurality of nozzles directing a stream of fluid to impinge against the first zone is greater than a number of the plurality of nozzles directing a stream of fluid to impinge against the second zone.

According to a nineteenth aspect disclosed herein, a method comprises the method of the seventeenth or eighteenth aspects, wherein a temperature of the fluid impinging against the first zone is less than a temperature of the fluid impinging against the second zone.

According to a twentieth aspect disclosed herein, a method comprises the method of any of the seventeenth through nineteenth aspects, wherein the cooling surface comprises a deflector extending outward from the cooling surface, and wherein the deflector redirects the fluid impinging the first zone or the second zone to prevent the fluid from contacting the other of the second zone or the first zone of the cooling surface of the mold shell.

Additional features and advantages will be set forth in the detailed description, which follows, and in part will be readily apparent to those skilled in the art from that description or recognized by practicing the embodiments described herein, including the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 5A illustrates an example fluid supply system for supplying fluid to an adjustable nozzle system through a single inlet in accordance with one or more embodiments shown and described herein;

FIG. 5B illustrates an example fluid supply system for supplying fluid to an adjustable nozzle system in which each nozzle is provided fluid by a corresponding inlet in accordance with one or more embodiments shown and described herein;

FIG. 5C illustrates an example fluid supply system for supplying fluid to an adjustable nozzle system in which an inlet provides fluid to all of the nozzles in a particular zone in accordance with one or more embodiments shown and described herein;

DETAILED DESCRIPTION

Figure 1A:
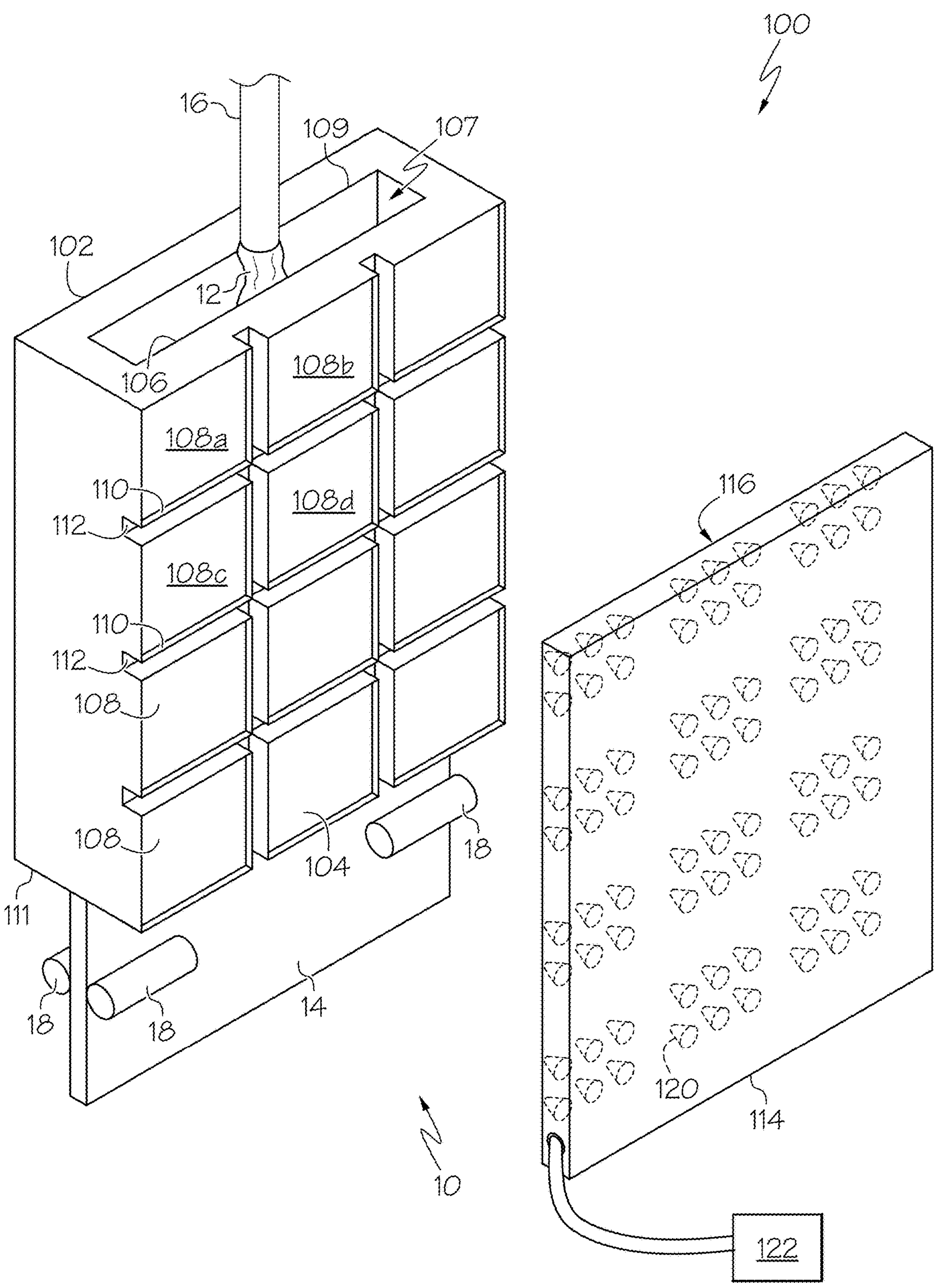
FIG. 1A illustrates a molding apparatus including adjustable cooling nozzles in a glass casting process in accordance with one or more embodiments shown and described herein.

Reference will now be made in detail to various embodiments of molding apparatuses and methods of using the same, examples of which are illustrated in the accompanying drawings. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

FIG. 1A depicts a molding apparatus 100 for forming a glass article in a casting process. The molding apparatus 100 includes a mold shell 102 comprising a cooling surface 104 through which heat is extracted from the glass article being formed and a glass contact surface 106 that is in contact with the glass article being formed. In embodiments, the glass contact surface 106 is thermally coupled to the cooling surface 104. In embodiments, the glass contact surface 106 defines a cavity 107 within the mold shell 102 for receiving a flow of molten glass 12. As shown in FIG. 1A, the molten glass 12 flows into the cavity 107 of the mold shell 102 through an inlet end 109 and a glass article 14 exits the cavity 107 of the mold shell 102 through an outlet end 111. In embodiments, the molding apparatus 100 may be incorporated into a glass casting line 10 that also includes a glass delivery tube 16 for delivering the flow of molten glass 12 to the cavity 107 of the mold shell 102 and one more pulling rollers 18 for pulling the glass article 14 out of the molding apparatus 100. Other components can be included in the glass casting line 10, as will be recognized by those of ordinary skill in the art.

The mold shell 102 may be made of a material capable of withstanding high temperatures, such as temperatures that are encountered while forming the glass article. The material may be one that will not react with (e.g., stick to) the glass under forming conditions. Alternatively, the glass contact surface 106 may be coated with a coating material that will not react with (e.g., stick to) the glass under forming conditions. For example, in embodiments, the mold shell 102 is made of a non-reactive carbon material, such as graphite, and the glass contact surface 106 is highly polished to avoid introducing defects into the glass when the glass contact surface 106 is in contact with the glass. As another example, in embodiments, the mold shell 102 is made of a dense ceramic material, such as silicon carbide, tungsten carbide, and/or silicon nitride, and the glass contact surface 106 is coated with a hard ceramic material, such as titanium aluminum nitride. However, it should be understood that other materials are contemplated and possible, including, but not limited to stainless steel, bronze, and nickel alloys.

The cooling surface 104 includes two or more zones, collectively referred to herein by reference number 108. Although the embodiment shown in FIG. 1A includes twelve distinct zones, it is contemplated that as few as two zones or as many as twenty-five or more zones may be included in the cooling surface 104. The number of zones can vary, for example, based on the surface area of the cooling surface, the number of nozzles, the cooling fluid employed, or the application in which the molding apparatus is used.

In various embodiments, each zone 108*a* is thermally isolated from each adjacent zone 108*b*, 108*c*, and 108*d*. The zones 108 can be thermally isolated from one another by a deflector 110 extending outward from the cooling surface 104, a groove 112 in the cooling surface 104, or a combination thereof, as depicted in FIG. 1B. In embodiments including deflectors 110 and grooves 112, the deflectors 110 may be positioned around or adjacent the grooves 112, or the deflectors 110 and grooves 112 may be located in different locations. In embodiments, such as the embodiment shown in FIG. 1B, at least one deflector 110 extends outward from the cooling surface along a longitudinal edge of a groove 112. As specifically shown in FIG. 1B, a deflector 110 extends outward from each longitudinal edge of each groove 112. However, other orientations and combinations are possible and contemplated. For example, although the embodiment shown in FIGS. 1A and 1B includes both deflectors 110 and grooves 112, it is contemplated that embodiments may include deflectors 110 and not grooves, or grooves 112 and not deflectors. Moreover, although the embodiment shown in FIGS. 1A and 1B includes deflectors 110 and grooves 112 at each interface between the zones, it is contemplated that embodiments may include a different combination of deflectors and grooves. For example, the cooling surface 104 may include a deflector 110 to thermally isolate each zone 108*a* from a zone 108*c* that is vertically adjacent (e.g., above/below), and a groove 112 to thermally isolate the zone 108*a* from a zone 108*b* that is horizontally adjacent (e.g., next to). Other arrangements are possible and contemplated.

Figure 1C:
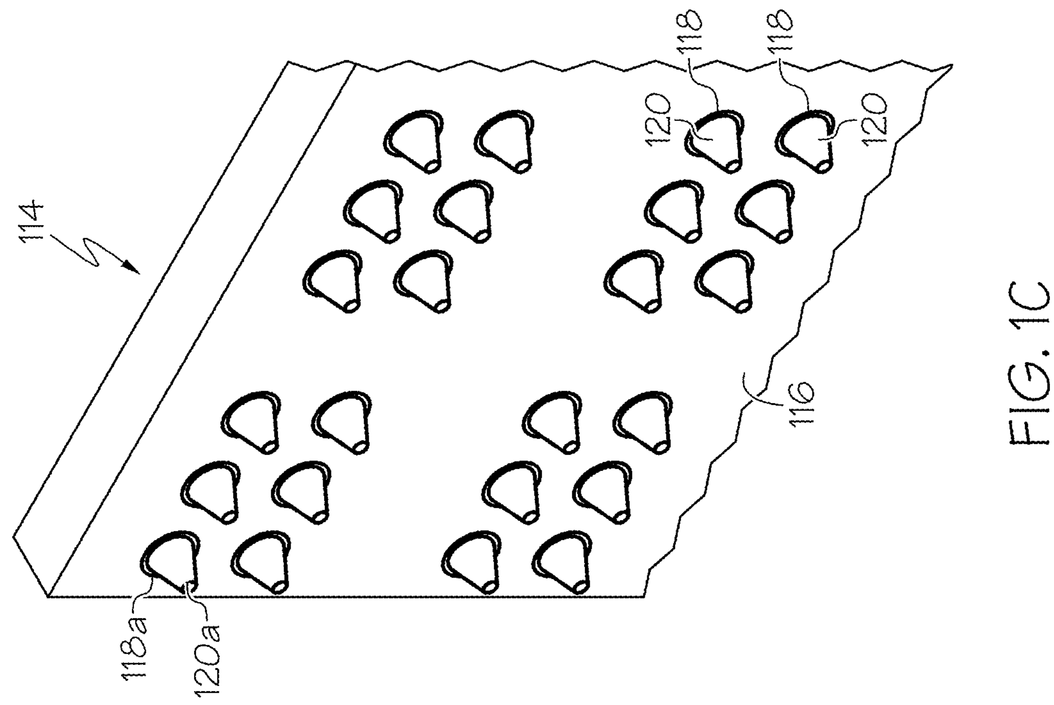
FIG. 1C illustrates the mold-facing surface of the adjustable nozzle system shown in FIG. 1A including a plurality of nozzles extending through the apertures in accordance with one or more embodiments shown and described herein.
Figure 1B:
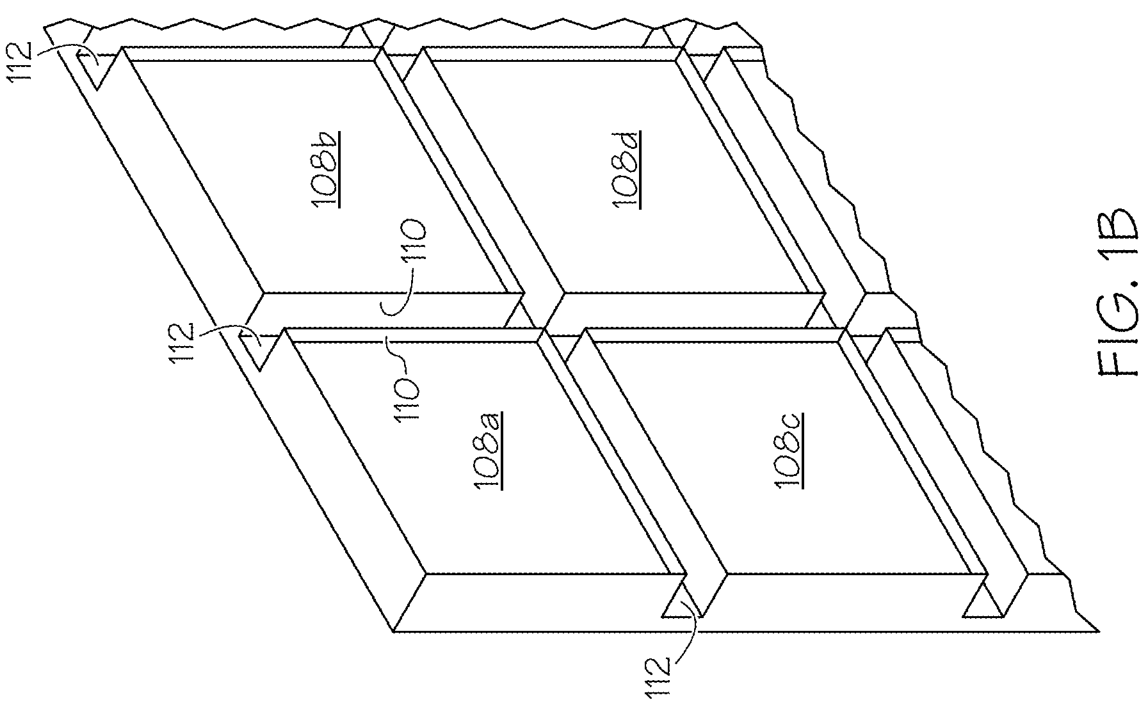
FIG. 1B illustrates the cooling surface of the molding apparatus of FIG. 1A in greater detail in accordance with one or more embodiments shown and described herein.

The molding apparatus 100 also includes an adjustable nozzle system 114 having a mold-facing surface 116 having a plurality of apertures, collectively referred to herein as apertures 118, as depicted in FIG. 1C. Each of the apertures 118 is sized to receive a nozzle or a plug, as will be described in greater detail below. In embodiments, each of the apertures 118 includes interior threading (not shown), which can enable the corresponding nozzle or plug to be secured in place, although in embodiments, threading is not included.

As shown in FIG. 1C, the molding apparatus 100 includes a plurality of nozzles, collectively referred to herein as nozzles 120. Each of the nozzles 120 is coupled to and extends through a corresponding one of the apertures 118, such that each nozzle 120*a* extends through an aperture 118*a* in the mold-facing surface 116. When coupled to the corresponding aperture, each of the nozzles 120 is oriented such that it can direct a stream of fluid onto the cooling surface 104 of the mold shell 102.

In the embodiments described herein, the molding apparatus 100 further includes a fluid supply 122 coupled to the adjustable nozzle system 114 for providing a fluid through the plurality of nozzles 120. In embodiments, the fluid supply 122 is coupled to the adjustable nozzle system 114 through tubing or piping, one or more pumps, and other optional fluid delivery system components, such as filters, valves, and the like. In embodiments, the fluid supply 122 may include or be coupled to at least one cooling device configured to control a temperature of the fluid supplied to the nozzles 120. For example, a heat sink, a thermoelectric cooler, or another type of cooling device can be coupled to or positioned within the fluid supply 122 to adjust the temperature of the fluid. In embodiments, a thermostat is additionally coupled to the fluid supply 122 to measure and/or monitor the temperature of the fluid supply 122. As will be appreciated, the thermostat, cooling device, pump, and other components of the fluid delivery system can be communicatively coupled to a control unit (not shown) that directs the operation of the fluid delivery system to enable fluid to be supplied from the fluid supply 122 to the nozzles 120.

In embodiments, the fluid supplied to the nozzles 120 may be any suitable liquid or gas. For example, the fluid may be an oil, water, or other fluid composition that has high thermal capacity and low viscosity. Although a wide variety of fluids are contemplated and possible, in embodiments, the fluid is water.

The fluid supplied by the fluid supply 122 is jetted through the nozzles 120 to impinge against the cooling surface 104 to remove heat from the mold shell 102 that is imparted to the mold shell 102 by the glass in contact with the glass contact surface 106 of the mold shell 102. When included, each deflector 110 is of a size and shape to deflect fluid that has impinged the cooling surface 104 away from the cooling surface 104 after impingement. For example, fluid that has impinged the zone 108*a* is directed away from the cooling surface 104 by deflector 110*a* such that the fluid does not run down the cooling surface 104 and also contact zone 108*c* or other zones below zone 108*a*. Deflectors in other orientations can block splash of the fluid during or after impingement on the cooling surface 104, in addition to or as an alternative to acting as a thermal shield between adjacent zones.

In various embodiments, the cooling in each zone 108 is individually controllable and varies from one zone to another. Accordingly, in various embodiments, the fluid impinging against the first zone causes a first cooling intensity and the fluid impinging against the second zone causes a second cooling intensity that is different from the first cooling intensity. As used herein, the "cooling intensity" is represented by the magnitude of the heat transfer coefficient of each zone. The different cooling intensities can be generated, for example, by varying a number of nozzles for each of the zones, varying a temperature of the fluid for each of the zones, varying an amount of fluid impinging against each of the zones, or combinations thereof. As used herein, when a parameter is referred to as varying for each of the zones, it is meant that the parameter for one zone is different than the parameter for another, different zone, in contrast to the parameter varying over the zone.

Figure 2:
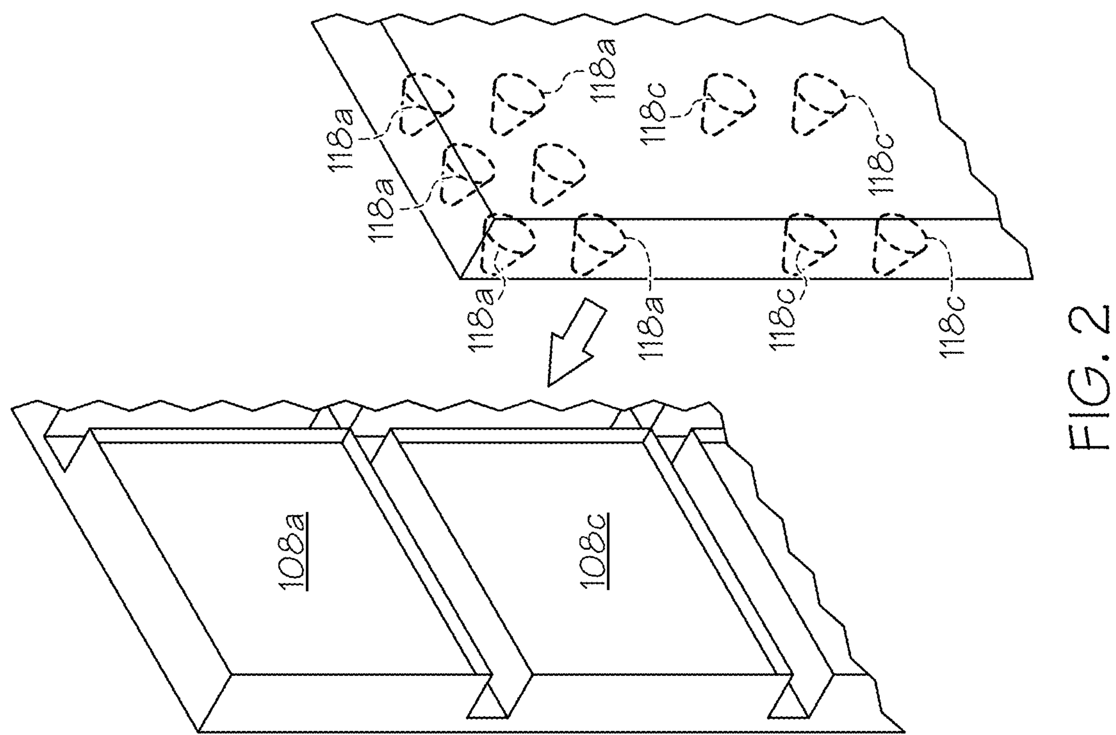
FIG. 2 illustrates an example adjustable nozzle system in accordance with one or more embodiments shown and described herein.

In embodiments in which the cooling intensity is varied by varying a number of nozzles for each of the zones, it is contemplated that the number of nozzles directing fluid toward each zone of the cooling surface can be varied according to any one or more of a number of ways. For example, the number of apertures 118*a* in the adjustable nozzle system proximate a zone 108*a* may differ from the number of apertures 118*c* in the adjustable nozzle system proximate a zone 108*c*, as shown in FIG. 2. Alternatively or additionally, in embodiments, the number of nozzles 120*a* through which fluid is jetted to impinge against zone 108*a* differs from the number of nozzles 120*c* through which fluid is jetted to impinge against zone 108*c*. The number of nozzles 120 can vary because of a differing number of apertures 118 for each of the zones 108*a*, 108*c*, or because one or more of the apertures 118*c* does not include a nozzle 120, as shown in FIG. 3.

Figure 3:
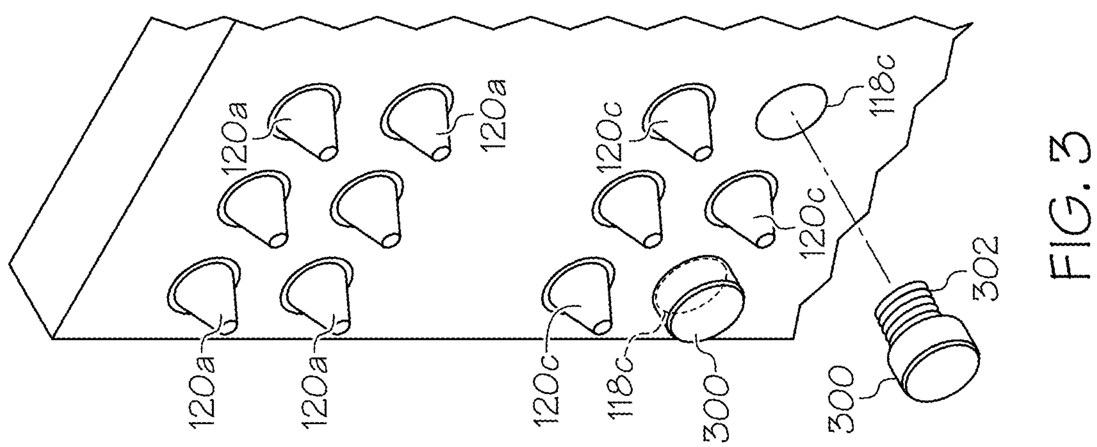
FIG. 3 illustrates another example adjustable nozzle system in accordance with one or more embodiments shown and described herein.

In the embodiment shown in FIG. 3, the molding apparatus 100 includes at least one plug 300 that is coupled to a corresponding aperture 118. The plug 300 causes an amount of fluid impinging against the zone 108*a* to differ from an amount of fluid impinging against the zone 108*b* by reducing the number of apertures available for coupling with nozzles. The use of plugs 300 enables the number of apertures 118 that are coupled to nozzles 120 and the number of apertures 118 that are coupled to plugs 300 to be varied without requiring the adjustable nozzle system to be replaced, retooled, or the like. Instead, in order to increase the cooling intensity in a particular zone, one or more plugs 300 can be removed from the corresponding apertures 118 and a nozzle 120 can be coupled to each open aperture 118.

Accordingly, in embodiments, each aperture 118 can be coupled to either a nozzle 120 or a plug 300. To facilitate such coupling, in embodiments in which the apertures 118 include internal threading, each nozzle 120 and plug 300 includes corresponding external threading 302 and is sized to be coupled with an aperture 118. Similarly, in embodiments in which the apertures 118 do not include internal threading, each nozzle 120 and plug 300 do not have external threading and may instead, for example, have a substantially smooth exterior surface such that the nozzle 120 or plug 300 slides into and out of the aperture 118.

The size and shape of the plug 300 are not limited, provided the plug 300 reduces the amount of fluid, or even prevents fluid, from passing through the aperture 118 to which it is coupled, thereby reducing the amount of fluid impinging on the corresponding zone 108*c* (not shown in FIG. 3) of the cooling surface. Similarly, the size and shape of the nozzle 120 are not limited, provided the nozzle 120 is operable to direct a stream of fluid onto the cooling surface. For example, in embodiments, the nozzle 120 may be an adjustable nozzle 120 through which the stream of fluid can be adjusted. In embodiments, the nozzle 120 may be closed to prevent fluid from flowing therethrough.

As set forth above, in embodiments, the cooling intensity may also be varied between the different zones by varying an amount of fluid impinging against each of the zones. The amount of fluid can be varied as described above, such as by providing a different number of nozzles through which fluid impinges a first zone as compared to a number of nozzles through which fluid impinges a second zone. However, the amount of fluid can be varied in a number of other ways while the number of nozzles remains unchanged. Enabling the amount of fluid to be adjusted without changing the number of nozzles can enable embodiments to provide adjustable cooling intensity during the forming of a glass article (e.g., while the molding apparatus is in use). For example, in embodiments, one or more of the nozzles 120 may be an adjustable nozzle 120 through which the stream of fluid can be adjusted. In embodiments, the nozzle 120 may be partially or fully closed to reduce or even prevent fluid from flowing therethrough.

Figure 4A:
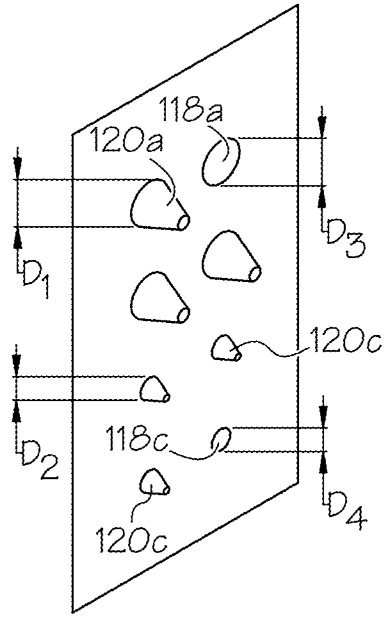
FIG. 4A illustrates an example adjustable nozzle system in which some apertures have different diameters than other apertures in the adjustable nozzle system in accordance with one or more embodiments shown and described herein.
Figure 4B:
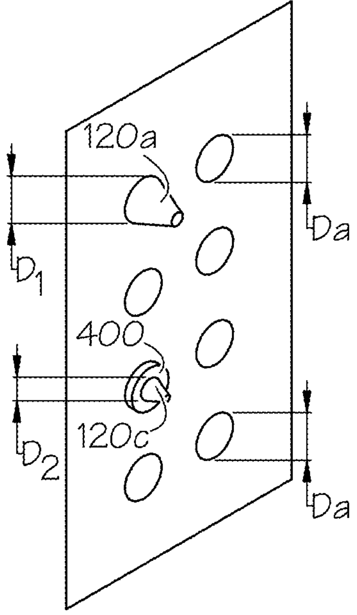
FIG. 4B illustrates an example adjustable nozzle system in which nozzles having different diameters are adapted to fit apertures of a constant diameter in accordance with one or more embodiments shown and described herein.
Figure 4C:
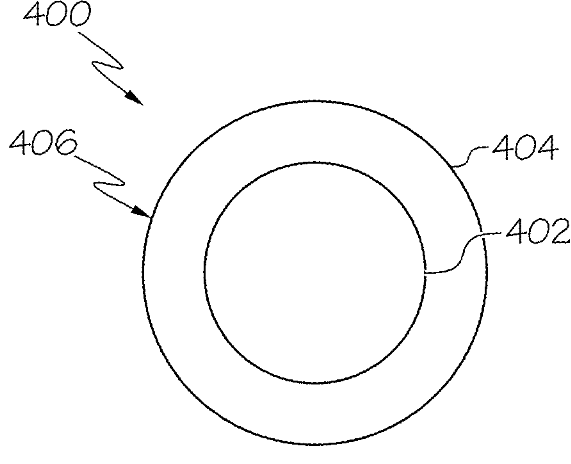
FIG. 4C illustrates an example size adjuster used to couple nozzles having smaller diameters with apertures having a larger diameter in accordance with one or more embodiments shown and described herein.

In embodiments, one or more of the nozzles may be of a different size than one or more other nozzles included in the adjustable nozzle system. As shown in FIGS. 4A and 4B, for example, nozzles 120*a* have a diameter $D_1$ that is larger than a corresponding diameter $D_2$ of nozzles 120*c*. In some such embodiments, such as shown in FIG. 4A, some apertures 118*c* (e.g., those corresponding to nozzles 120*c*) have a diameter $D_3$ that is larger than a corresponding diameter $D_4$ of other apertures 118*c* (e.g., those corresponding to nozzles 120*c*). In other such embodiments, such as shown in FIG. 4B, each of the apertures 118 in the adjustable nozzle system has the same diameter Da that is sized to receive the larger nozzles 120*b*, and the smaller nozzles 120*c* can be coupled to the apertures through a size adjuster 400. As shown in FIG. 4C, the size adjuster 400 has a wall 402 that defines an inner diameter 404 that is sized to receive the smaller nozzle 120*c* and an outer diameter 406 that is sized to fit within the aperture 118. Other methods of coupling the nozzles with the apertures are contemplated and possible.

Additionally or alternatively, in embodiments, the amount of fluid impinging against a zone 108 of the cooling surface 104 can be varied by varying the amount of fluid provided to one or more nozzles through an inlet 500 of the adjustable nozzle system, as shown in FIGS. 5A, 5B, and 5C. In embodiments, the fluid supply provides fluid to the adjustable nozzle system through the inlet 500, and the fluid exits the adjustable nozzle system through one or more nozzles 120. The number of nozzles 120 that are fluidly coupled with the inlet 500 can vary depending on the particular embodiment. For example, a single inlet 500 can be coupled to all of the nozzles 120 in the adjustable nozzle system through a common plenum 502, as shown in FIG. 5A, or multiple inlets can be used to provide fluid to all of the nozzles 120 through multiple plenums 502, as shown in FIGS. 5B and 4C. In embodiments, an inlet 500 can provide fluid to, for example, one nozzle 120 (FIG. 5B), two or more nozzles, all of the nozzles directing fluid to one zone (FIG. 5C), or all of the nozzles directing fluid to more than one, but less than all, of the zones of the cooling surface. Embodiments in which multiple inlets are used to provide fluid to the nozzles can enable the flow of fluid to the nozzles to which a first inlet is coupled to be controlled independently of the flow of fluid to the nozzles to which a second inlet is coupled.

In embodiments, control through an inlet can be controlled by increasing or decreasing a flow rate, including, for example, stopping the flow of fluid through the inlet. In embodiments, the flow (e.g., through the inlet, the nozzles, or both) can be controlled to provide a pulsed flow of fluid. Additionally or alternatively, in embodiments, the fluid provided through a first inlet can have a temperature that is different than a temperature of the fluid provided through a second inlet. Accordingly, as set forth above, in embodiments, the cooling intensity may also be varied between the different zones by varying a temperature of the fluid for each of the zones.

For example, the fluid provided to one inlet to impinge on a first zone 108*a* of the cooling surface can have a lower temperature and/or increased flow rate than the temperature and/or flow rate of the fluid provided to another inlet to impinge on a second zone 108*c* such that the cooling intensity of the first zone 108*a* is greater than the cooling intensity of the second zone 108*c*. Thus, referring back to FIG. 1A, the molding apparatus 100 can be cooled at a greater intensity near the inlet end 109 of the mold shell 102 than near the outlet end 111 of the mold shell 102.

Figures 6A, 6B:
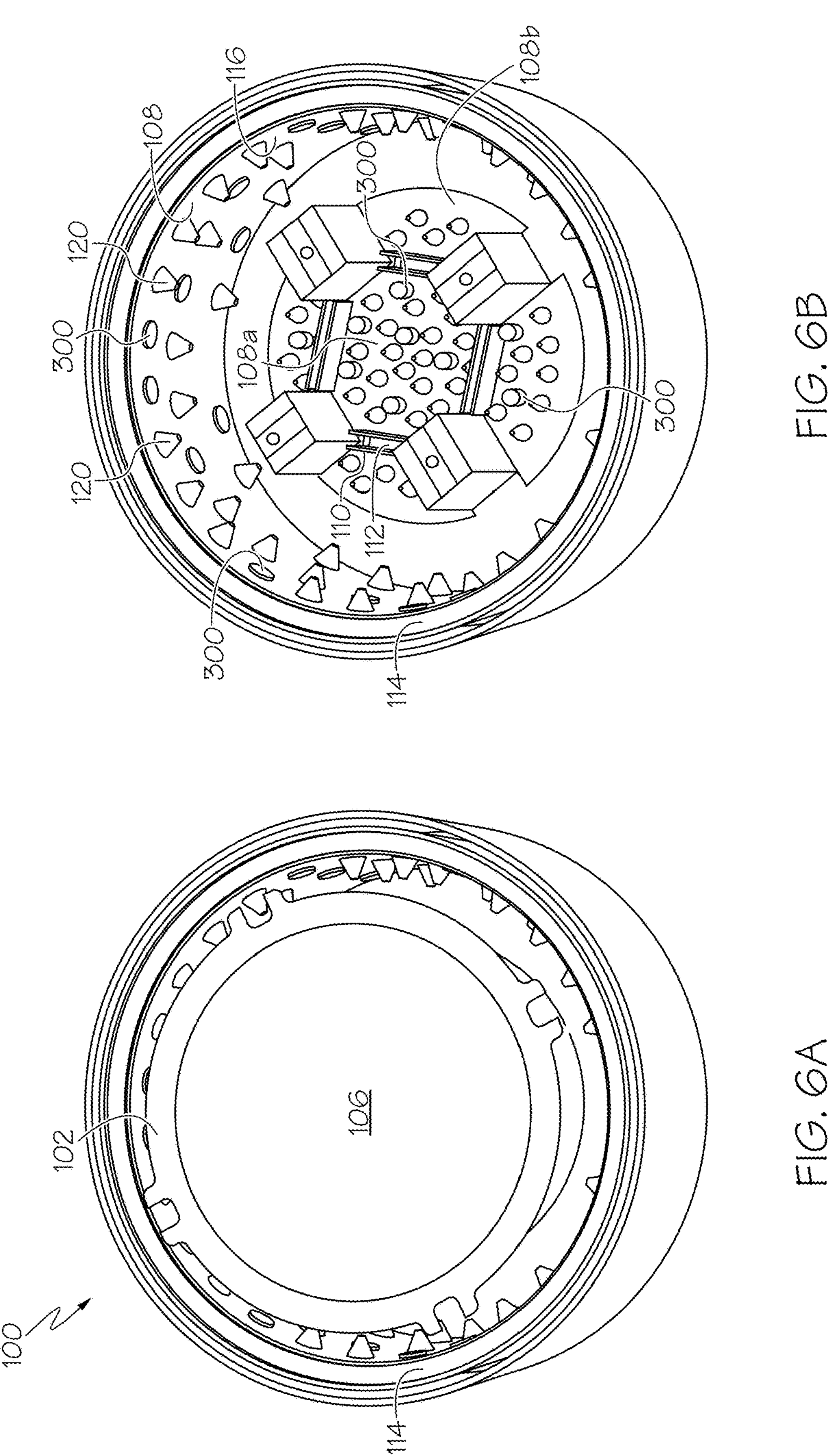
FIG. 6A illustrates a molding apparatus including adjustable cooling nozzles in a glass pressing process in accordance with one or more embodiments shown and described herein.
FIG. 6B illustrates the molding apparatus of FIG. 6A with the mold shell removed to expose the adjustable nozzle system in accordance with one or more embodiments shown and described herein.

Although FIG. 1A depicts the molding apparatus 100 as being incorporated into a glass casting line 10, it is contemplated that various embodiments of the molding apparatus 100 can be used in other glass forming methods, such as, by way of example and not limitation, glass pressing methods, as shown in FIGS. 6A and 6B. In FIG. 6A, the molding apparatus 100 is oriented such that the glass is placed on the glass contact surface 106 of the mold shell 102 instead of being directed into a cavity defined by the mold shell 102 in the form of molten glass. FIG. 6B depicts the molding apparatus 100 of FIG. 6A with the mold shell 102 removed to expose the mold-facing surface 116 of the adjustable nozzle system 114. In embodiments, each zone 108 extends along and lies within the same substantially horizontal plane and deflectors 110 extend outward from that plane. Accordingly, it is contemplated that although the molding apparatus 100 is described herein with respect to certain orientations, the molding apparatus 100 may be otherwise oriented depending on the particular embodiment described herein and, in particular, depending on the particular glass forming process in which it is employed.

Having described various embodiments of glass molding apparatuses in detail, methods of using the glass molding apparatus will now be described. When used in a glass casting line 10, as shown in FIG. 1, a flow of molten glass 12 is poured into the cavity 107 of the mold shell 102 through a glass delivery tube 16. The flow of molten glass 12 enters the inlet end 109 of the cavity 107, and heat is transferred from the molten glass 12 to the glass contact surface 106. Fluid is supplied to the nozzles 120 by the fluid supply 122, and the nozzles 120 direct the fluid to a corresponding one of the zones 108 of the cooling surface 104.

The heat from the molten glass 12 is transferred from the glass contact surface 106 to the cooling surface 104 via conduction. The heat is then transferred from the cooling surface 104 to the fluid via convection as the fluid impinges the cooling surface 104. Cooling can be adjusted by adjusting the temperature or flow of the cooling fluid through one or more of the nozzles, or by replacing one or more of the nozzles with a plug, depending on the particular embodiment.

In the embodiment shown in FIG. 1, the glass contact surface proximate zone 108*a* removes a greater amount of heat from the flow of molten glass than the glass contact surface proximate zone 108*b*, reducing the temperature of the flow of molten glass and enabling the glass to solidify. As the glass solidifies, it is pulled through the outlet end 111 of the cavity 107 by one or more pulling rollers 18 as a glass article 14. The rate of speed of the pulling rollers 18 can be adjusted by a control unit to draw the glass article 14 from the molding apparatus 100 at a predetermined rate to ensure that the glass resides in the cavity 107 for a sufficient time to solidify. In embodiments, after it is pulled from the molding apparatus 100, the glass article 14 is subjected to additional processing, which may include, by way of example and not limitation, cutting, rolling, and annealing.

When used in a glass pressing method, as shown in FIGS. 6A and 6B, a flow of molten glass 12 is poured into the cavity 107 of the mold shell 102. In embodiments, a plunger (not shown) is used to apply pressure to the molten glass and to force the molten glass into contact with the glass contact surface 106. Heat is transferred from the molten glass 12 to the glass contact surface 106. Fluid is supplied to the nozzles 120 by the fluid supply 122, and the nozzles 120 direct the fluid to a corresponding one of the zones 108 of the cooling surface 104.

The heat from the molten glass 12 is transferred from the glass contact surface 106 to the cooling surface 104 via conduction. The heat is then transferred from the cooling surface 104 to the fluid via convection as the fluid impinges the cooling surface 104. Cooling can be adjusted by adjusting the temperature or flow of the cooling fluid through one or more of the nozzles, or by replacing one or more of the nozzles with a plug, depending on the particular embodiment.

In the embodiment shown in FIG. 6A, the glass contact surface proximate zone 108*a* removes a greater amount of heat from the flow of molten glass than the glass contact surface proximate zone 108*b*, reducing the temperature of the flow of molten glass and enabling the glass to solidify. Following solidification, the glass article 14 is removed from the molding apparatus 100, according to methods known and used in the art. In embodiments, after it is removed from the molding apparatus 100, the glass article 14 is subjected to additional processing, which may include, by way of example and not limitation, cutting and annealing.

In various embodiments described herein, the molding apparatus including an adjustable nozzle system enables heat extraction during a glass molding step to be adjusted over the area of the molding surface. In particular, the use of an adjustable nozzle system as described in various embodiments enables fluid impinged against a plurality of thermally isolated zones of a cooling surface of a glass mold to be adjusted according to zone such that one zone may be cooled at a rate that is different from a rate of another zone. The number of nozzles, size of nozzles, temperature of fluid passing through the nozzles, or speed of fluid passing through the nozzles can be adjusted to control a cooling intensity or heat extraction rate at each of the zones on the cooling surface. Accordingly, a molding apparatus can be used in a variety of molding processes, and can be tuned to provide a target cooling intensity at different points on the glass contact surface, such as a higher cooling intensity at areas proximate an inlet for molten glass and a lower cooling intensity at areas proximate an outlet for a solid glass article and may, in embodiments, be adjusted during the glass forming process.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of cooling molten glass to form a glass article, the method comprising:

flowing molten glass into a cavity defined by a cooling surface of a mold shell, the cooling surface comprising a first zone and a second zone such that the first zone and the second zone are thermally isolated from one another;

supplying fluid to an adjustable nozzle system comprising a mold-facing surface having a plurality of apertures, each of the plurality of apertures sized to receive one of a plurality of nozzles; and each of the plurality of nozzles coupled to and extending through a corresponding one of the plurality of apertures to direct a first stream of fluid onto the cooling surface of the mold shell to impinge against the first zone to cause a first cooling intensity and to direct a second stream of fluid to impinge against the second zone to cause a second cooling intensity, the first cooling intensity and the second cooling intensity drawing heat away from the molten glass, thereby cooling the molten glass to form a glass article, wherein the second cooling intensity is different from the first cooling intensity.

2. The method of claim 1, wherein a number of the plurality of nozzles directing the first stream of fluid to impinge against the first zone is greater than a number of the plurality of nozzles directing the second stream of fluid to impinge against the second zone.

3. The method of claim 1, wherein a temperature of the fluid impinging against the first zone is less than a temperature of the fluid impinging against the second zone.

4. The method of claim 1, wherein a diameter of the plurality of nozzles directing the first stream of fluid to impinge against the first zone is greater than a diameter of the plurality of nozzles directing the second stream of fluid to impinge against the second zone.

5. The method of claim 1, wherein an amount of fluid impinging against the first zone is greater than an amount of fluid impinging against the second zone.

6. The method of claim 1, wherein a flow rate of the first stream of fluid impinging against the first zone is greater than a flow rate of the second stream of fluid impinging against the second zone.

7. The method of claim 1, wherein the cooling surface comprises a deflector extending outward from the cooling surface, and wherein the deflector redirects the fluid impinging the first zone or the second zone to prevent the fluid from contacting the other of the second zone or the first zone of the cooling surface of the mold shell.

8. The method of claim 1, wherein the plurality of apertures comprises a first aperture with one of the plurality of nozzles inserted therethrough and a second aperture with a plug inserted therethrough.

9. The method of claim 1, wherein the molten glass flows through the cavity of the mold shell and the cooling surface is an outer surface of the mold shell.

10. The method of claim 1, wherein each of the plurality of nozzles directs a stream of fluid onto the cooling surface of the mold shell to remove heat from the mold shell.

11. The method of claim 1, wherein the plurality of nozzles direct multiple streams of fluid onto the cooling surface of the mold shell to impinge against the first zone to cause the first cooling intensity and direct multiple streams of fluid onto the cooling surface of the mold shell to impinge against the second zone to cause the second cooling intensity.

12. The method of claim 1, further comprising flowing the glass article from an outlet end of the cavity.

* * * * *